United States Patent [19]

Margotte et al.

[11] 3,988,389

[45] Oct. 26, 1976

[54] MOULDING COMPOSITIONS CONTAIN POLYCARBONATE AND GRAFT COPOLYMER OF A RESIN FORMING MONOMER ON A RUBBER

[75] Inventors: Dieter Margotte; Hermann Schirmer, both of Krefeld; Karl-Heinz Ott, Leverkusen; Günther Kampf, Krefeld-Bockum; Günter Peilstocker, Krefeld-Bockum; Hugo Vernaleken, Krefeld-Bockum, all of Germany

[73] Assignee: Bayer Aktiengesellschaft, Germany

[22] Filed: Sept. 19, 1975

[21] Appl. No.: 614,913

Related U.S. Application Data

[63] Continuation of Ser. No. 421,487, Dec. 3, 1973, abandoned.

[30] Foreign Application Priority Data

Oct. 25, 1973 Germany............................ 2353428
Dec. 6, 1972 Germany............................ 2259565

[52] U.S. Cl. .............................................. 260/873
[51] Int. Cl.$^2$.................. C08L 55/02; C08L 69/00
[58] Field of Search .................................... 260/873

[56] References Cited

UNITED STATES PATENTS

| 3,130,177 | 4/1964 | Grabowski .......................... 260/45.5 |
| 3,162,695 | 12/1964 | Grabowski .......................... 260/873 |
| 3,663,471 | 5/1972 | Schirmer et al. ..................... 260/40 |
| 3,873,641 | 3/1975 | Margotte et al. ................... 260/873 |
| 3,947,524 | 3/1976 | Mozumi et al. ..................... 260/873 |

Primary Examiner—Donald E. Czaja
Assistant Examiner—Earl A. Nielsen
Attorney, Agent, or Firm—Connolly and Hutz

[57] ABSTRACT

The invention relates to moulding compositions containing polycarbonate and graft copolymers of resin-forming monomers on a rubber.

4 Claims, No Drawings

MOULDING COMPOSITIONS CONTAIN POLYCARBONATE AND GRAFT COPOLYMER OF A RESIN FORMING MONOMER ON A RUBBER

CROSS-REFERENCE TO RELATED APPLICATION

This application is a continuation of application Ser. No. 421,487 filed Dec. 3, 1973 and now abandoned.

German Pat. No. 1,170,141 discloses moulding compositions of from 90 to 30% by weight of a polycarbonate of di-(monohydroxyphenyl)-substituted aliphatic hydrocarbons and from 10 to 70% by weight of a graft polymer prepared from polybutadiene and a mixture of acrylonitrile and an aromatic vinyl hydrocarbon. When processed by injection moulding, these compositions yield mouldings with weld lines of inadequate strength. For example, a lattice-like moulding produced by injection moulding may actually break during mould release.

The object of the present invention is to provide improved moulding compositions which do not have this deficiency.

Accordingly, the invention relates to moulding compositions containing polycarbonate and graft copolymers of resinforming monomers on a rubber.

More particularly, the invention relates to moulding compositions of:
1. from 70 to 30 parts by weight of a thermoplastic polycarbonate, and
2. from 30 to 70 parts by weight of a mixture of
2.1. 25 to 100% by weight of a graft copolymer of a
2.1.1. rubber onto which a
2.1.2. monomer mixture of
2.1.2.1. 95 to 50% by weight of styrene, methyl methacrylate or mixtures thereof, and
2.1.2.2. 50 to 5% by weight of acrylonitrile, methylmethacrylate or mixtures thereof, is polymerised and
2.2. 0 to 75% by weight of a copolymer of
2.2.1. 95 to 50% by weight of styrene, α-methylstyrene, methyl methacrylate or mixtures thereof
2.2.2. 50 to 5% by weight of acrylonitrile, methacrylonitrile, methyl methacrylate or mixtures thereof.

wherein
a. the ratio by weight of (2.1.1) rubber to (2.1.2) monomer mixture is from 85 : 15 to 40 : 60,
b. the graft copolymer (2.1) in the moulding composition consists of particles having an average diameter of from 0.2 to 5$\mu$, preferably from 0.2 to 1.0$\mu$, and
c. the moulding composition contains from 10 to 35% by weight, preferably from 15 to 30% by weight, of the rubber (2.1.1).

These moulding compositions yield mouldings having high strength in the weld line. Generally, the strength of the weld line amounts to distinctly more than 10 cmkp/cm$^2$. Thus complicated mouldings with numerous weld lines, such as lattices, can easily be made. The mechanical properties of such mouldings are similar to those of corresponding mouldings of pure polycarbonate.

Basically, any thermoplastic polycarbonates are suitable for the moulding compositions of the invention. Polycarbonates are known in the art and can be obtained by reacting dihydroxy or polyhydroxy compounds with phosgene or diesters of carbonic acid. Particularly suitable dihydroxy compounds are dihydroxy diarylalkanes, including those which contain alkyl groups or chlorine or bromine atoms in the o-position to the hydroxyl group. The following represent preferred dihydroxy diarylalkanes: 4,4'-dihydroxy-2,2-diphenyl propane (bisphenol A), tetramethyl bisphenol A, tetrachlorobisphenol A, tetrabromobisphenol A and bis-(4-hydroxyphenyl)-p-diisopropylbenzene. In addition to polycarbonates produced from dihydroxy diarylalkanes alone, it is also possible to use branched polycarbonates. To produce polycarbonates of this kind, part of the dihydroxy compound, for example from 0.2 to 2 mol %, is replaced by a polyhydroxy compound. Examples of suitable polyhydroxy compounds are 1,4-bis-(4',4,2'-dihydroxy triphenylmethyl)-benzene, phloroglucin, 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane and 2,2-bis-[4,4-(4,4'-dihydroxy diphenyl)-cyclohexyl]-propane.

Polycarbonates of the aforementioned kind are described for example in U.S. Pat. Specification Nos. 3,028,365; 2,999,835; 3,148,172; 3,271,368; 2,970,137; 2,991,273; 3,271,367; 3,280,078; 3,014,891 and 2,999,846. The polycarbonates preferably have molecular weights in the range of from 10,000 to 60,000, more particularly from 20,000 to 40,000.

In a preferred embodiment a mixture of two polycarbonates is used. This mixture contains
50–85% by weight of a polycarbonate made from a halogen free polyphenol and
15–50% by weight of a halogen containing polycarbonate of the formula

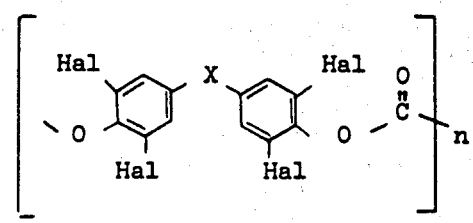

wherein
$n = 15$ to 200
X = alkylene or alkylidene having 1–5 carbon atoms; cycloalkylene or cycloalkylidene having 5–15 carbon atoms; a singel bond; —O— or

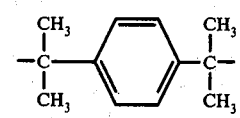

Hal = chlorine or bromine.
Preferably the final mixture contains 10 to 30% by weight of the halogen containing polycarbonate.

As shown by the formula, such halogen containing polycarbonates are based on phenols containing at least two benzene nuclei and carrying 4 halogen (chlorine, bromine) atoms. The molecular weights of such polycarbonates are preferably from 16,000 to 35,000. When these polycarbonate mixtures are used the thermal stability and moduli of elasticity found in the products are exceptionally high.

The second constituent of the moulding compositions is a rubber based graft copolymer. In these products, a monomer mixture of from 95 to 50% by weight of styrene, methyl methacrylate or mixtures thereof and from 5 to 50% by weight of acrylonitrile, methyl methacrylate or mixtures thereof, is graft-polymerised on to a rubber. Particularly suitable rubbers are polybutadiene, butadiene/styrene copolymers having up to 30% by weight of copolymerised styrene, copolymers of butadiene and acrylonitrile with up to 20% by weight of acrylonitrile, or copolymers of butadiene with up to 20% by weight of a lower alkyl ester of acrylic or methacrylic acid (for example methyl acrylate, ethyl acrylate, methyl methacrylate and ethyl methacrylate). In principle, any elasticising components can be used providing they show rubber-elastic behaviour.

The ratio by weight of rubber to graft-polymerised monomers must be within the range of from 85 : 15 to 40 : 60. The graft polymers must be present in the moulding composition in the form of particles having an average diameter of from 0.2 to 5 $\mu$, preferably from 0.2 to 1 $\mu$.

Graft copolymers of this kind are known. They are obtained, for example, by polymerising the monomers on a rubber latex in the presence of a radical catalyst. The size of the rubber particles in this latex is preferably in the range from 0.2 to 1 $\mu$, because graft polymerisation of the monomers does not produce any appreciable increase in the size of the particles.

In addition to the graft copolymer, the moulding composition can also contain a copolymer of the graft monomers or similar monomers. The copolymer in question consists of 95 to 50% by weight of styrene, α-methyl styrene, methyl methacrylate or mixtures thereof with 5 to 50% by weight of acrylonitrile, methacrylonitrile, methyl methacrylate or mixtures thereof. Copolymers of this kind are frequently formed as secondary products during the graft polymerisation reaction, especially in cases where large quantities of monomers are grafted on to small quantities of rubber. In this connection, it is possible to add separately prepared copolymers of this kind in addition to or instead of the copolymers thus formed.

The two or three constituents of the moulding compositions according to the invention can be separately prepared and then mixed in known mixers. Mixers suitable for this purpose include, for example, mixing rolls, double-screw extruders or internal mixers. It is also possible initially to prepare the mixture of the graft polymer and the copolymer, i.e. the mixture specified in 2, by working up the two components together, and then to combine this mixture with the polycarbonate. Fillers, glass fibres, pigments or other additives such as stabilisers, flameproofing agents, fluxes, lubricants, mould-release agents, anti-static agents, can also be added to the moulding compositions during mixing.

The moulding compositions according to the invention can be used for the production of mouldings of any kind. In particular, mouldings can be produced by injection moulding. Examples of mouldings which can be produced from the moulding compositions according to the invention include housing sections of any kind (for example for domestic appliances such as liquidisers, coffee machines and mixers) or cover panels for the building industry. They are particularly suitable for use in electrical engineering because they have extremely favourable electrical properties. Another form of processing is the production of mouldings by deep drawing from prefabricated sheets or films.

EXAMPLE 1 (Comparison Example)

60 parts by weight of an ABS-graft polymer mixture consisting of
a. 30 parts by weight of a graft polymer (I), prepared by grafting 35 parts by weight of styrene and 15 parts by weight of acrylonitrile on to 50 parts by weight of a coarse-particle polybutadiene (by emulsion polymerisation in accordance with DAS 1,247,665 and DAS 1,269,360), the average particle diameter of the polybutadiene graft base present in latex form being in the range of from 0.3 to 0.4 $\mu$, and
b. 70 parts by weight of a styrene-acrylonitrile copolymer with a styrene : acrylonitrile ratio of 70 : 30 and a limiting solution viscosity $[\eta]$ of 79.1 (as measured in dimethyl formamide at 20° C), were thoroughly mixed at 240° C in an internal kneader with 40 parts by weight of an aromatic polycarbonate based on 4,4'-dihydroxy-2,2-diphenyl propane (bisphenol A) with a relative solution viscosity $\eta_{rel}$ of 1.28 (as measured in a concentration of 5 g/l in methylene chloride at 25° C), and the resulting product granulated.

EXAMPLE 2

60 parts by weight of an ABS-graft polymer mixture consisting of
a. 65 parts by weight of the graft polymer (I) of Example 1, and
b. 35 parts by weight of a copolymer of styrene-acrylonitrile in a ratio of 70 : 30 with a limiting solution viscosity $[\eta]$ of 79.1, were processed into a homogeneous mixture at 230° C with 40 parts by weight of an aromatic polycarbonate based on bisphenol A with a relative solution viscosity $\eta_{rel}$ of 1.280, as described in Example 1.

EXAMPLE 3

50 parts by weight of an ABS-graft polymer mixture consisting of
a. 65 parts by weight of the graft polymer (I) of Example 1, and
b. 35 parts by weight of a copolymer of styrene-acrylonitrile in a ratio of 70 : 30 with a limiting solution viscosity $[\eta]$ of 79.1, were homogeneously mixed at 250° C with 50 parts by weight of an aromatic polycarbonate based on bisphenol A with a relative solution viscosity $\eta_{rel}$ of 1.280, as described in Example 1.

EXAMPLE 4

70 parts by weight of an ABS-graft polymer mixture consisting of
a. 80 parts by weight of the graft polymer (I) of Example 1, and
b. 20 parts by weight of a copolymer of styrene-acrylonitrile in a ratio of 81 : 19 with a limiting solution viscosity $[\eta]$ of 80.9, were mixed at 250° C in an internal kneader with 30 parts by weight of an aromatic polycarbonate based on bisphenol A with a relative solution viscosity $\eta_{rel}$ of 1.29, and the resulting product was granulated as described in Example 1.

EXAMPLE 5

40 parts by weight of an ABS-graft polymer mixture consisting of a. 80 parts by weight of the graft polymer (I) of Example 1, and
b. 20 parts by weight of a copolymer of styrene-acrylonitrile in a ratio of 80 : 20 with a limiting solution viscosity $[\eta]$ of 81.3, were extruded in a double-screw extruder with 60 parts by weight of an aromatic polycarbonate based on bisphenol A with a relative solution viscosity $\eta_{rel}$ of 1.260, and the resulting product was granulated.

EXAMPLE 6

60 parts by weight of an ABS-graft polymer mixture consisting of
a. 65 parts by weight of a graft polymer prepared by grafting 16.25 parts by weight of styrene and 8.75 parts by weight of acrylonitrile on to 75 parts by weight of a coarse-particle polybutadiene (by emulsion polymerisation in accordance with DAS 1,247,665 and DAS 1,269,360), the average particle diameter being in the range of from 0.3 to 0.4 $\mu$, and
b. 35 parts by weight of a copolymer of styrene-acrylonitrile in a ratio of 80 : 20 with a limiting solution viscosity $[\eta]$ of 106, were extruded at 230° C in a double-screw extruder with 40 parts by weight of an aromatic polycarbonate based on bisphenol A with a relative solution viscosity $\eta_{rel}$ of 1.26, and the resulting product was granulated.

EXAMPLE 7

60 parts by weight of an ABS-graft polymer mixture consisting of
a. 50 parts by weight of the graft polymer (I) of Example 1, and
b. 50 parts by weight of a copolymer of styrene-acrylonitrile in a ratio of 65 : 35 with a limiting solution viscosity $[\eta]$ of 79.7, were mixed at 250° C with 40 parts by weight of an aromatic polycarbonate based on 93 mol % of bisphenol A and 7 mol % of tetrabromobisphenol A with a relative solution viscosity $\eta_{rel}$ of 1.31, and the resulting product was granulated as described in Example 1.

EXAMPLE 8

30 parts by weight of an ABS-graft polymer mixture consisting of
a. 90 parts by weight of a graft polymer prepared by grafting 25 parts by weight of styrene and 5 parts by weight of acrylonitrile on to 70 parts by weight of a coarse-particle polybutadiene (by emulsion polymerisation in accordance with DAS 1,247,665 and DAS 1,269,360), the average particle diameter of the polybutadiene graft base present in latex form being in the range of from 0.3 to 0.4 $\mu$, and
b. 10 parts by weight of styrene-acrylonitrile copolymer in a ratio of 90 : 10 with a limiting solution viscosity $[\eta]$ of 79.9, were mixed in an internal kneader at 280° C with 70 parts by weight of an aromatic polycarbonate based on bisphenol A with a relative solution viscosity $\eta_{rel}$ of 1.280, and the resulting product was granulated as described in Example 1.

EXAMPLE 9

70 parts by weight of an ABS-graft polymer mixture consisting of
a. 95 parts by weight of a graft polymer prepared by grafting 45 parts by weight of styrene and 15 parts by weight of acrylonitrile onto 40 parts by weight of a coarse-particle polybutadiene (by emulsion polymerisation in accordance with DAS 1,247,665 and DAS 1,269,360), the average particle diameter of the polybutadiene graft base present in latex form being in the range of from 0.3 to 0.4 $\mu$, and
b. 5 parts by weight of a copolymer of styrene-acrylonitrile in a ratio of 70 : 30 with a limiting solution viscosity $[\eta]$ of 80.7, were extruded in a double-screw extruder at 220° C with 30 parts by weight of an aromatic polycarbonates based on bisphenol A with a relative solution viscosity $\eta_{rel}$ of 1.280, and the resulting product was granulated.

EXAMPLE 10

60 parts by weight of an ABS-graft polymer mixture consisting of
a. 50 parts by weight of a graft polymer, prepared by grafting 24 parts by weight of styrene and 16 parts by weight of acrylonitrile on to 60 parts by weight of a coarse-particle polybutadiene (by emulsion polymerisation in accordance with DAS 1,247,665 and DAS 1,269,360), the average particle diameter of the polybutadiene graft base present in latex form being in the range of from 0.3 to 0.4 $\mu$, and
b. 50 parts by weight of a copolymer of styrene-acrylonitrile in a ratio of 85 : 15 with a limiting solution viscosity $[\eta]$ of 81.0, were homogenised with 40 parts by weight of an aromatic polycarbonate based on 85 mol % of bisphenol A and 15 mol % of tetrachlorobisphenol A with a relative solution viscosity $\eta_{rel}$ of 1.32, and the resulting product was granulated as described in Example 1.

EXAMPLE 11 (Comparison Example)

50 parts by weight of an ABS-graft polymer mixture consisting of
a. 70 parts by weight of a graft polymer (II) prepared by grafting 35 parts by weight of styrene and 15 parts by weight of acrylonitrile on to 50 parts by weight of a finely divided polybutadiene with an average particle diameter of from 0.05 to 0.15 $\mu$, and
b. 30 parts by weight of a copolymer of styrene-acrylonitrile in a ratio of 70 : 30 with a limiting solution viscosity $[\eta]$ of 80.9, were mixed at 245° C with 50 parts by weight of an aromatic polycarbonate based on bisphenol A with a relative solution viscosity $\eta_{rel}$ of 1.30, and the resulting product was extruded as described in Example 1.

| | Values for weld-line strength, Vicat number and E-modulus | | | | |
|---|---|---|---|---|---|
| | Total rubber content | | | | |
| Polymer mixture of Example | coarse-particled | fine-particled | Weld line strength cmkp/cm$^2$ | Vicat number ° C | E-modulus kp/cm$^2$ |
| 1 | 9.0 | — | 3 | 138 | 24,000 |
| 2 | 19.5 | — | 12 | 130 | 20,000 |

-continued

Values for weld-line strength, Vicat number and E-modulus

| Polymer mixture of Example | Total rubber content coarse-particled | Total rubber content fine-particled | Weld line strength cmkp/cm² | Vicat number °C | E-modulus kp/cm² |
| --- | --- | --- | --- | --- | --- |
| 3 | 16.3 | — | 11 | 135 | 21,000 |
| 4 | 28.0 | — | 19 | 120 | 16,000 |
| 5 | 16.0 | — | 10 | 133 | 20,500 |
| 6 | 29.3 | — | 22 | 118 | 15,600 |
| 7 | 15.0 | — | 11 | 135 | 22,000 |
| 8 | 18.9 | — | 12 | 132 | 20,000 |
| 9 | 26.6 | — | 16 | 133 | 22,800 |
| 10 | 18.0 | — | 13 | 133 | 22,000 |
| 11 | — | 17.5 | 3 | 135 | 20,000 |

EXAMPLE 12

1. Polycarbonates

Viscosities determined in methylenechloride at 25° C at a concentration of 5 g/l ($\eta_{rel}$); $M_w$ = molecular weight (weight average)

| A) Bisphenol-A-polycarbonate | $\eta_{rel}$ = 1,30 |
| --- | --- |
| | $M_w$ = ca. 31.000 |
| B) Copolycarbonate of 80 mol-% bisphenol A and 20 mol-% tetrabromobisphenol A | $\eta_{rel}$ = 1,25 |
| | $M_w$ = ca. 30.500 |
| C) Low molecular tetrabromobisphenol -A- polycarbonate | $\eta_{rel}$ = 1,03 |
| | $M_w$ = ca. 4.500 |
| D) High molecular tetrabromobisphenol -A- polycarbonate | $\eta_{rel}$ = 1,08 |
| | $M_w$ = ca. 16.000 |
| E) High molecular tetrabromobisphenol -A- polycarbonate | $\eta_{rel}$ = 1,08 |
| F) Copolycarbonate of 84 mol-% bisphenol A and 16 mol-% tetrachlorobisphenol A | $M_w$ = ca. 35.000 |
| | $\eta_{rel}$ = 1,27 |
| | $M_w$ = ca. 31.000 |
| G) High molecular tetrachlorobisphenol -A- polycarbonate | $\eta_{rel}$ = 1,12 |
| | $M_w$ = 23.000 |

2. Graft copolymer/copolymer-mixtures

Mixture H 60 parts by weight of a graft polymer made by grafting of 35 parts by weight styrene and 15 parts by weight acrylonitrile onto 50 parts by weight of a polybutadiene having coarse particles (cf. German Auslegeschriften 1,247,665 and 1,269,360 referring to emulsion polymerisation), the mean particle diameter of the polybutadiene being from 0.3 to 0.4 μ, and 40 parts by weight of a styrene-acrylonitrile-copolymer having a styrene-acrylonitrile ratio of 70 : 30 and an intrinsic viscosity of [$\eta$] = 79,1 (determined in dimethylformamide at 20° C), mixed by joint precipitation of their latices.

Mixture J 70 parts by weight of a graft copolymer, made by grafting 16,25 parts by weight styrene and 8,75 parts by weight acrylonitrile onto 75 parts by weight of a polybutadiene having coarse particles (cf. German Auslegeschriften 1,247,665 and 1,269,360 referring to an emulsion polymerisation), the mean particle diameter of the polybutadiene being from 0.3 to 0.4 μ, and 30 parts by weight of a copolymer of styrene-acrylonitrile in a ratio of 80 : 20 and an intrinsic voscisity of [$\eta$]= 106, mixed by joint precipitation of their latices.

The following table contains the mixtures of the invention which were made by mixing the components in an internal mixer and their physical data.

Table

| Example | 1 | 2 | 3 | 4 | 5 | 6 | 7 | 8 | 9 | 10 |
| --- | --- | --- | --- | --- | --- | --- | --- | --- | --- | --- |
| polycarbonate A) | 40 | — | 32 | 32 | 40 | — | 40 | 40 | 50 | 60 |
| polycarbonate B) | — | 40 | — | — | — | — | — | — | — | — |
| polycarbonate C) | — | — | 8 | — | — | — | 20 | — | — | — |
| polycarbonate D) | — | — | — | 8 | — | — | — | — | 20 | 10 |
| polycarbonate E) | — | — | — | — | 20 | — | — | — | — | — |
| polycarbonate F) | — | — | — | — | — | 50 | — | — | — | — |
| polycarbonate G) | — | — | — | — | — | — | — | 20 | — | — |
| mixture H) | 60 | 60 | 60 | 60 | — | — | — | — | — | — |
| mixture J) | — | — | — | — | 40 | 50 | 40 | 40 | 30 | 30 |
| notched impact strength cmkp/cm² | 24 | 24 | 17 | 23 | 24 | 22 | 20 | 24 | 23 | 22 |
| Vicat B[x] °C | 115 | 114 | 112 | 126 | 128 | 115 | 113 | 123 | 127 | 126 |
| modulus of elasticity kp/cm²[xx] | 20.000 | 19.700 | 18.000 | 24.900 | 26.300 | 19.700 | 19.200 | 25.800 | 26.000 | 26.000 |

[x]determined according to DIN 53 460
[xx]determined according to DIN 53 455

We claim:

1. A moulding composition of:
from 70 to 30 parts by weight of a thermoplastic polycarbonate which is a mixture of 50–85% by weight of a polycarbonate made from a halogen free phenol and 15–50% by weight of a halogen containing polycarbonate of the formula

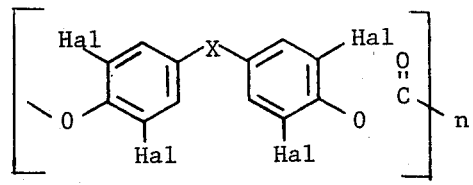

wherein
n is 15–200
X is alkylene or alkylidene having 1–5 carbon atoms; cycloalkylene or cycloalkylid having 5–15 carbon atoms; a single bond; —O—; or

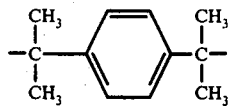

and Hal is chlorine or bromine; and from 30 to 70 parts by weight of from 25 to 100% by weight of a graft polymer of a rubber onto which a grafting monomer mixture of from 95 to 50% by weight of styrene, methyl methacrylate or a mixture thereof, and
from 50 to 5% by weight of acrylonitrile, methyl methacrylate or a mixture thereof is polymerized wherein a. the ratio by weight of the rubber to said grafting monomer mixture is within the range of from 85:15 to 40:60;
b. the graft copolymer in the moulding composition consists of particles having an average diameter of from 0.2 to 5.0μ; and
c. the moulding composition contains from 10 to 35% by weight of the rubber.

2. A moulding composition as claimed in claim 1, wherein the moulding composition also contains
up to 75% by weight of a copolymer of
from 95 to 50% by weight of styrene, α-methyl-styrene, methyl methacrylate or a mixture thereof
from 50 to 5% by weight of acrylonitrile, methacrylonitrile, methyl methacrylate or a mixture thereof.

3. A moulding composition as claimed in claim 1, wherein *b* the graft copolymer in the moulding composition consists of particles having an average diameter of from 0.2 to 1.0μ.

4. A moulding composition as claimed in claim 1, wherein *c* the moulding composition contains from 15 to 30% by weight of the rubber.

* * * * *